March 27, 1956 M. I. LEVY 2,739,852
BEARING
Filed March 21, 1952
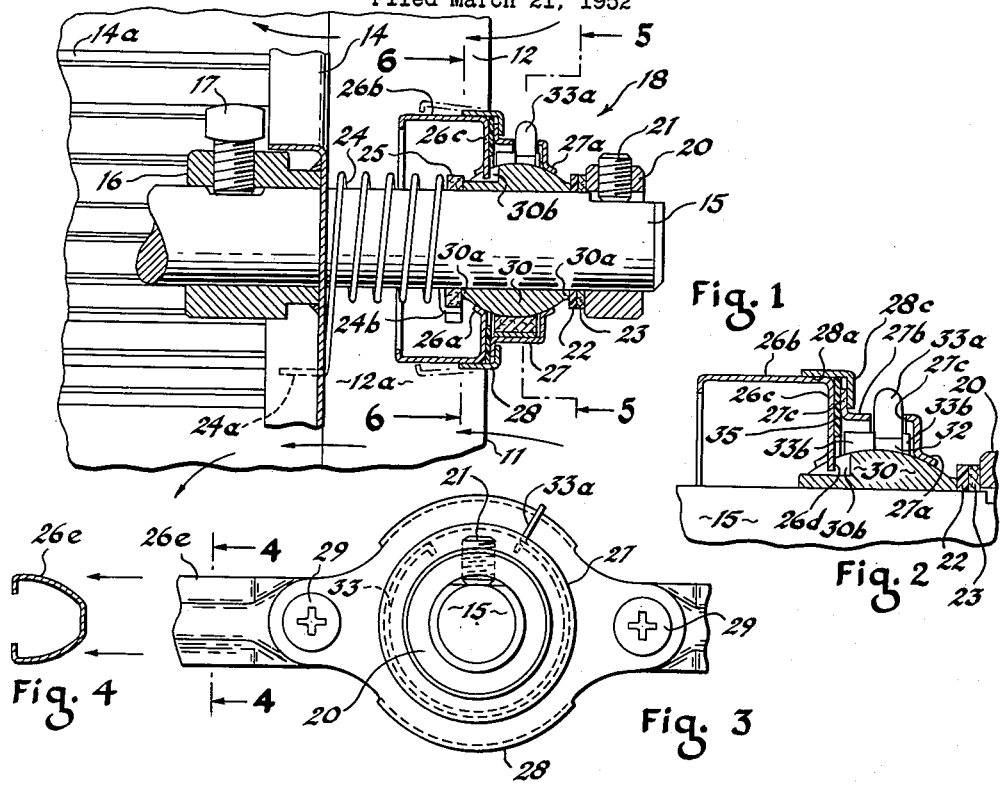
Fig. 1
Fig. 2
Fig. 4
Fig. 3
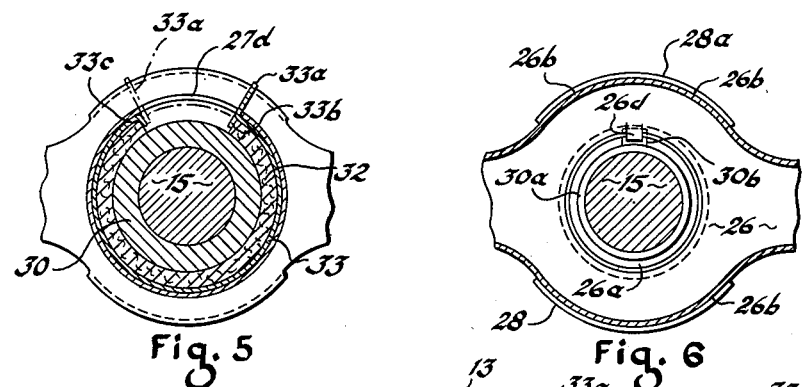
Fig. 5
Fig. 6
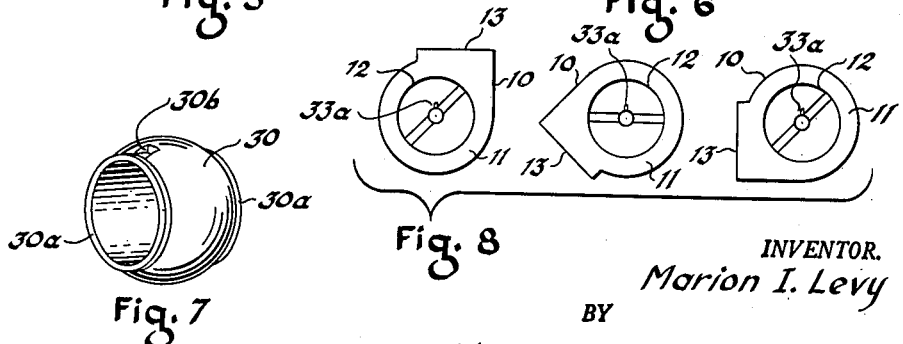
Fig. 7
Fig. 8
INVENTOR.
Marion I. Levy
BY
Hyde, Meyer, Baldwin & Doran

# United States Patent Office 2,739,852
Patented Mar. 27, 1956

2,739,852

BEARING

Marion I. Levy, Shaker Heights, Ohio, assignor to The National-U. S. Radiator Corporation, a corporation of Maryland Application March 21, 1952, Serial No. 277,782

19 Claims. (Cl. 308—121)

This invention relates to improvements in bearings and more particularly to a self-aligning bearing for a rotating shaft.

One of the objects of the present invention is to provide a self-aligning bearing of the type described having a bearing housing composed of at least two parts with coaxial apertures engaging a spherical peripheral surface of a bearing member for universal movement and wherein each part has coaxial cylindrical locating surfaces to assure alignment between said parts.

Another object of the present invention is to provide a self-aligning bearing of the type described having a porous bearing member with a portion of its periphery spherical in form for universal movement and having a cylindrical bore for rotatably mounting a shaft.

Another object of the present invention is to provide a bearing of the type described having a bearing member with a surrounding bearing retainer rotatably mounted on a supporting bracket whereby an oil hole in said retainer may always be turned upwardly for convenient lubrication without other changes in said bearing member.

Another object of the present invention is to provide a bearing of the type described having a bearing member with a surrounding bearing retainer forming an annular passageway therebetween for rotatably supporting a sliding cover for an oil port in said retainer.

Another object of the present invention is to provide a bearing which is inexpensive to manufacture, easy to assemble, and has low maintenance and operating cost.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a longitudinal sectional view through the novel bearing at one end of a blower housing and with the bearing supporting bracket shown in dot-dash lines in other possible positions taken with respect to the shaft;

Fig. 2 is an enlarged portion of Fig. 1;

Fig. 3 is an end view of the bearing taken from the right hand side of Fig. 1;

Fig. 4 is a cross sectional view through one of the arms of bearing bracket taken on the line 4—4 of Fig. 3;

Fig. 5 is a transverse sectional view through the bearing taken along line 5—5 of Fig. 1;

Fig. 6 is a transverse sectional view taken along the line 6—6 of Fig. 1;

Fig. 7 is a perspective view of the bearing ball; while

Fig. 8 shows three end views, reduced in size, of the whole blower taken from the right in Fig. 1 wherein each of said views shows the blower outlet in a different position while the oil port is always at the top of the bearing.

While this bearing invention might be adapted to various types of machines, I have chosen to show the same in connection with a furnace blower of known type.

The conventional centrifugal blower has a blower housing 10 (Fig. 8) having opposite side walls and an axial flow gas inlet in each side wall. One of the side walls, shown at 11 in Figs. 1 and 8, has an axial flow inlet 12 formed by an inwardly directed tubular portion 12a as a smooth continuation of the side wall. The incoming air or gas, flowing in the direction of the arrows in Fig. 1, is forced by the blower out the tangential outlet 13. The blower has a rotor 14, having longitudinally extending blades 14a around its periphery and is secured to a central shaft 15. In the present disclosure, the securing means consists of a hub 16 welded to the rotor 14 and having a set screw 17 bearing against a flat surface on the shaft 15. The shaft 15 is mounted in a bearing, generally shown at 18, at each of its opposite ends. This bearing will be described in more detail hereinafter since the present invention relates thereto. At the left end of shaft 15 in Fig. 1, a drive means (not shown) is provided in addition to the bearing 18 and may, if desired, take the form of a belt-driven pulley.

At the right end of shaft 15 a means is provided for preventing endwise movement of the shaft and rotor in the blower housing, as shown in Fig. 1. A thrust spring 24, surrounding the shaft and acting with a compressive force to normally push the rotor 14 to the left away from the bearing 18, has its inner end 24a engaged with the rotor 14 and its outer end 24b engaged in a radial slot formed in a hard fiber thrust washer 25 bearing against the bearing 18. A thrust collar 20, at the right of the bearing 18, is secured by a set screw 21 to a flat on the shaft 15. A fiber washer 22 surrounds the shaft and engages the bearing to form a wear-resisting surface between the bearing and a cushion washer 23, engaging the left side of the thrust collar 20. The thrust springs 24 and the cushion washer 23 act together to eliminate end play and noise.

The bearings 18, 18 at each end of shaft 15 are self-aligning since slight misalignment of the bearings could cause excessive and irregular bearing wear by the rotating shaft 15 and eventual bearing breakdown. Misalignment can be caused by rough handling during shipment or by inexact assembly of parts during manufacture. Since the bearings at each end of shaft 15 are exactly identical, only one will be described, namely the self-aligning bearing 18 in Fig. 1.

Each bearing 18 includes a bearing bracket 26 in bridging relationship across and between the inlet tubular wall sides 12a, diametrically across each inlet 12. The bearing bracket, formed as a one-piece stamping, has an air foil cross sectional contour, as seen in Fig. 4, to reduce the resistance to air flow. To reduce the possibility of misalignment during assembly, the opposite outer ends of the bearing bracket 26 are fitted into die-formed depressions in the inlet bore of housing wall 12a and then spot-welded or otherwise secured in permanent position. The bearing bracket has an enlarged mid-portion with a central aperture extending therethrough. An annular surface extends around the edge of the aperture and takes the form, in the present disclosure, of a surrounding annular flange 26a, as shown in Figs. 1 and 2. Partially cylindrical locating surfaces 26b are formed on the periphery of the enlarged mid-portion of the bearing bracket. This cylindrical surface portion is coaxial with the central aperture and with the tubular inlet 12a. A transversely disposed annular web 26c connects the annular flange 26a and the cylindrical locating surfaces 26b.

The self-aligning bearing 18 also includes a bearing retainer member 27 formed as a one-piece stamping. It has a central aperture having an annular surface on its inner edge, which in the present disclosure, takes the form of a surrounding annular flange 27a. A cylindrical locating surface 27b is formed on the retainer member coaxial with the aperture and has an outwardly extending and transversely disposed annular web 27c at its left end in Figs. 1 and 2.

The self-aligning bearing is provided with means for securing the bearing bracket 26 and the bearing retainer member 27 together. This means permits relative rotation between said members 26 and 27 around the axis of the shaft 15 and also aligns the central apertures having annular flanges 26a and 27a in coaxial, spaced apart relationship. In the present disclosure, this means includes a locking ring 28 secured to the bearing bracket 26 by screws 29. This ring has partially cylindrical and cylindrical surfaces telescoped over and mutually engaging with the cylindrical locating surfaces 26b and 27b, respectively. These surfaces on ring 28 take the form of partially cylindrical bores 28a engaging the partially cylindrical locating surfaces 26b and of a central hole 28b, coaxial with the bores 28a, engaging the cylindrical locating surface 27b. A connecting, transversely extending annular web 28c is adapted to squeeze the registering webs 26c and 27c toward each other and to compress an oil seal 35 located therebetween when the screws 29, 29 are tightened.

The bearing bracket 26, bearing retainer member 27, and locking ring 28 form a bearing housing surrounding a bearing member 30 in Figs. 1 and 2. This bearing member in the present disclosure takes the form of a bearing ball having a portion of its periphery with a spherical surface. The annular flanges 26a and 27a conform in shape to the spherical surface and secure the bearing member 30 therebetween for limited universal movement (about 5° in any direction) for correcting any misalignment between the bracket 26 and the shaft 15. As shown in Fig. 7 as well as in Figs. 1 and 2, the bearing member 30 has cylindrical end-portions 30a, 30a forming shoulders adapted to engage one or both annular flanges 26a and 27a to limit the universal movement of the bearing ball 30. A cylindrical bore extends through the bearing ball 30 for rotatably supporting the shaft 15.

It should be apparent that the annular surfaces around the inner edges of the central apertures in the bearing bracket 26 and the bearing retainer member 27 need not take the form of annular flanges, as shown at 26a and 27a. The annular edge surface formed on the inner bore of each aperture may be quite satisfactory without having a flange formed thereon.

Although the structure disclosed supra has many advantages, as will be brought out in more detail hereinafter, additional changes can be made in the structure while still preserving some of the advantages. For example, the cylindrical and partially cylindrical locating surfaces of the bearing bracket 26, bearing retainer member 27 and the locking ring 28 need not take the form mentioned. The locking ring 28 and the bearing retainer member 27 may be made integral so that the locating bore surfaces 28a are a part of the bearing retainer member 27. Also, partially cylindrical locating surfaces 26b and 28a could be made completely cylindrical if the two radially extending arms of the bracket 26 were displaced axially to the left in Fig. 1. However, this would increase the axial length of the bearing. Also, if the bearing 18 is not of the self-aligning type, the bearing member 30 can be of the sleeve form instead of the ball form with the spherical periphery, as in the present disclosure. These are only a few of the structural variations which might be utilized, if one were to sacrifice some of the advantages of the bearing in its preferred form.

After the blower has been assembled and the spherical periphery of the bearing member 30 has moved, if necessary, in the bearing housing to correct any misalignment, the shaft 15 can be rotated in the bearing member bore while the bearing member 30 does not rotate with respect to the bearing bracket 26 or the blower housing. Means is provided for preventing relative rotation between this bearing member 30 and the bearing bracket 26 about an axis coaxial with the bearing member bore or with the shaft 15. An inwardly directed lug 26d is formed from a portion of the flange 26a. This lug is adapted to engage in a notch 30b in the spherical surface of the bearing member 30. This notch is elongated along the axial length of the bearing member 30 so that it will not interfere with the self-aligning movement of the bearing ball 30. Although this rotation preventing means is used in the present disclosure and has been found useful, it need not necessarily be present in all bearings coming within the scope of the present invention.

An oil reservoir for the bearing exists in the annular passageway between the bearing member 30 and the bearing retainer member 27. The bearing member 30 is formed of sintered bronze, a thermo-porous material that holds oil like a sponge. The bearing member is about 30% oil. The oil in this annular passageway or reservoir not only flows along the spherical periphery of the bearing member 30 to lubricate the surface between the bearing member and the annular flanges 26a and 27a for universal movement but also flows through the pores or fine aperture in the bearing member to the central bore rotatably supporting the shaft 15.

The shape of the bearing member 30 provides a desirable type of controlled oil flow. The thick wall of the bearing member, midway along its axial length, is adapted to absorb a large amount of oil in its porous structure. It serves as a reservoir which releases the oil to the bore as it is needed by a thermo-porous action. As the bearing member 30 heats up slightly in use, the oil seeps through the pores into the cylindrical bore surrounding the shaft 15 to provide proper lubrication.

An oil port 27d is formed as a circumferential slot in the peripheral wall 27b of the bearing retainer member 27. Since the bearing retainer member 27 is rotatably mounted on the bearing bracket 26 by the locking ring 28, the oil port 27d can always be turned until it is in a convenient top position for filling with oil. Although the shaft 15 on the conventional furnace blower generally extends in a horizontal direction, the blower housing may have its outlet 13 directed in any one of many different directions. In Fig. 8, three different positions—up blast, angular and horizontal—of the outlet 13 are shown. No matter what the mounting position of the blower and its outlet, the bearing retainer can be revolved so that the oiling port is always in a handy top position, as shown at 27d in Fig. 8. Special bearing oil ports are not needed for each blower mounting position. Oil port 27d can be revolved a full 360° for readily positioning it above the bearing member 30 for easy filling. To set the oil port in proper position, a mechanic need merely loosen the locking ring screws 29, 29, turn the bearing retainer member 27 with his fingers until the oil port 27d is in its top position, and then tighten the locking ring screws 29, 29. The oil port will retain its desired position while the bearing is being used.

It should be noted that the oil port 27d is in vertical alignment above the thickest wall of the bearing member 30 in approximately vertical alignment with the center of the spherical surface. Oil entering the port 27d will immediately contact the thickest wall where the porous bearing member will absorb the most oil.

A clamping means is provided for preventing the bearing retainer member 27 from turning after the oil port 27d is properly positioned. This means, in the present disclosure, includes the locking ring 28 and the screws 29, 29. The annular web 27c of the locking ring squeezes together registering webs 26c and 27c of the bearing bracket 26 and the bearing retainer member 27, respectively, for preventing turning of the bearing retainer member 27 after the oil port 27d is poperly positioned.

An oil wick is provided in the annular passageway between the bearing retainer member 27 and the bearing member 30. This wick 32 is formed from a uniform width and thickness strip of felt bent along its lengthwise dimension to surround the periphery of the bearing member 30. This wick contacts the surface of the bearing member to supply the oil in a controlled amount from the oil port 27d to the periphery of the bearing members 30. This wick, annular in form, may extend, if desired, completely around bearing member 30. However, in the present disclosure, the wick does not quite form a complete annular form since it is short of a complete circle by the arcuate extent of the oil port 27d, as clearly shown in Fig. 5.

A sliding oil port closure 33 is formed as a stamping from uniform width and thickness material. It is of annular shape, surrounding the wick 32 and aligned between the wick 32 and the bore of the cylindrical portion 27b of the bearing retainer member 27. An actuating tab 33a, formed from a middle portion of the width of the closure 33, is bent in a radially outwardly extending direction and is somewhat smaller in width than the width of the oil port 27d so that it can freely slide in a circumferential direction therein. Radially inwardly extending lugs 33b, 33b are formed on each side of the actuating tab 33a from the material composing the closure 33. An inwardly and radially directed lug 33c is formed on the opposite end of the closure 33. The wick 32 is retained between the lugs 33b, 33b, 33c, the periphery of bearing members 30, the bore of the annular portion in the closure 33, and the inwardly directed flanges on each side thereof in Figs. 1 and 2.

The lugs 33b, 33b, 33c of the oil port closure 33 force the wick 32 to rotate with the closure around the bearing member 30 in the annular passageway. When actuating tab 33a is in the solid line position in Fig. 5 the oil port 27d is open and oil may be inserted therein. When the actuating tab 33a has been moved to the dot-dash position in Fig. 5 by rotating the closure counterclockwise, the oil port 27d is closed. The movement of the closure between open and closed positions forces the oil to move in the annular passageway and to be absorbed by the wick 32 and by the porous structure of the bearing member 30.

This bearing is easy to oil. A sufficient quantity of oil for an entire heating season can be put into the reservoir. The slide-type closure is easily pushed open or shut with an oil spout and in its closed position will always protect the bearing against the entry of dirt and dust. The actuating tab 33a and the oil port 27d are large and the closure will remain in either its open or its closed position without being held there. There is no small hard-to-hit oil hole obstructed by an annoying spring cap, always closing at the wrong time. The large oil port 27d assures that there will be no waiting for the air to vent, as in a small oil hole, before an adequate amount of oil can be put into the bearing. Oiling can be easily done by the domestic furnace user.

An oil seal 35, located between the registering webs 26c and 27c on the bearing bracket 26 and bearing retainer member 27, respectively, is squeezed into oil sealing relationship when the screws 29, 29 are tightened. This seal prevents oil leakage not only from between the webs 26c and 27c but also from between the partially cylindrical locating surfaces 26b and 28a and from between the webs 27c and 28c. It is placed in a strategic location so that one oil seal will prevent oil leakage from between several contacting surfaces.

This bearing is very easy to service since it is completely removable without disassembling the blower. In disassembly and removal of the bearing, the set screw 21 is loosened and the thrust collar 20 is removed (the pulley is removed when the bearing at the other end of the blower is to be disassembled). The two locking ring screws 29, 29 are then removed, and then the bearing member 30 can be slid axially along the shaft 15 to the right and will carry with it the bearing retainer member 27, locking ring 28, oil port closure 33, oil wick 32, and washers 22 and 23. After the bearing member 30 has been removed from the shaft, it is pulled to the left out from within the wick 32 and the bearing retainer member 27. Then, the wick 32 and closure 33 can be squeezed to reduce the diameter of their annular form and to bring lugs 33b and 33c closer together. The actuating tab 33a can then be pulled inwardly through the oil port 27d so that the wick 32 and closure 33 can be removed from the bearing retainer member 27. The wick 32 can be removed from the closure 33 by pushing its opposite ends away from the lugs 33b, 33b and 33c. The locking ring 28 will easily telescope or slide off of the cylindrical surface of the bearing retainer member 27.

In addition to easy assembly and disassembly as well as easy servicing, the bearing structure of the present invention has many other advantages. As mentioned before, the bearing bracket 26 is mounted in the tubular portion of the inlet 12 and is flush with the side wall 11 of the blower housing. This flush relationship allows the furnace designer more leeway in designing the cabinet for the blower.

The self-aligning feature provides advantages. Slight misalignment of the bearings can cause excessive and irregular bearing wear and eventual bearing breakdown. This misalignment can be caused by rough handling during shipment or by inexact assembly of parts during manufacture. The ball and socket design in the present invention permits up to 5° movement in any direction. No manual adjustment is necessary since both bearings 18, 18 are free to move and the shaft 15 positively aligns the bearings.

The rotatable oil port 27d, easily moved to and held in its top position, also offers advantages. It can be revolved through a full 360° and can be adjusted with the minimum of effort. The oil port is large so that it can be filled with little effort. The wick 32 as well as the oil port are located over the center or thickest part of the porous bearing member 30 so as to supply the oil through the portion of the bearing member having the largest oil capacity and serving as a reservoir in normal use. This oil port not only supplies oil through the porous bearing members 30 to the rotating shaft 15 but also supplies oil to the universal movement surfaces, shown as flanges 26a and 27a in Figs. 1 and 2. Of course, it should be understood that this 360° rotating oil port construction could be used as well with a sleeve bearing as with the self-aligning ball-type bearing member 30 disclosed in the present application.

Various changes in details and arrangement of parts can be made by one skilled in the art without departing from the spirit of this invention or the scope of the appended claims.

What I claim is:

1. In a bearing structure, a bearing bracket, a bearing retainer member, means rotatably mounting said retainer member on said bracket and keeping said bracket and retainer member assembled, a bearing member within said bearing retainer member and secured to said bracket by said retainer member, and said bearing retainer member having an oil port, said oil port being movable by rotating said retainer member until said port is above said bearing member, said mounting means including clamping means engageable in any rotative position of said retainer member for preventing said retainer member from turning after said oil port is positioned.

2. In a bearing structure, a bearing housing, a bearing member within said bearing housing, said bearing housing having an oil port, a portion of said bearing housing being spaced from said bearing member and forming an annular passageway around said bearing member, a wick in said annular passageway, said wick conforming in shape to said annular passageway while engaging at least a portion of the periphery of said bearing member, said oil port comprising an aperture in the periphery of said bearing housing portion forming said annular passageway, and a closure for said oil port slidably mounted in said annular passageway over said wick for closing said port, said closure being secured to said wick and conforming in shape to said anular passageway, whereby said wick and said closure rotate together around said bearing member as said closure is operated to open and close said port.

3. In a bearing structure, a bearing housing, a porous bearing member within said bearing housing, said bearing member having a cylindrical bore therethrough for rotatably supporting a shaft, said bearing housing having an oil port, a portion of said bearing housing being spaced from said bearing member and forming an annular passageway around said bearing member, a wick in said annular passageway, said wick conforming in shape to said annular passageway and nearly completely surrounding said bearing member while engaging the periphery of said bearing member, said oil port comprising an aperture in the periphery of said bearing housing portion forming said annular passageway, and a closure for said oil port slidably mounted in said annular passageway over said wick for closing said port, said closure being secured to said wick and conforming in shape to said annular passageway, whereby said wick and said closure rotate together around said bearing member as said closure is operated to open and close said port and whereby oil in said wick is adapted to permeate the pores of said bearing member from the bearing periphery to the cylindrical bore.

4. In a bearing structure, a bearing bracket, a bearing retainer member, means rotatably mounting said retainer member on said bracket while holding said bracket and retainer member together, a bearing member within said bearing retainer member and secured to said bracket by said retainer member, said bearing retainer member having an oil port, said oil port being movable by rotating said retainer member until said port is above said bearing member, said mounting means including clamping means for preventing said retainer member from turning after said oil port is positioned, a portion of said bearing retainer member being spaced from said bearing member and forming an annular pasageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

5. In a bearing structure, a bearing bracket, a bearing retainer member, means rotatably mounting said retainer member on said bracket by coacting with coaxial aligned at least partially cylindrical locating surfaces on said bracket and said bearing retainer member, a bearing member within said bearing retainer member and secured to said bracket by said retainer member, said bearing retainer member having an oil port, said oil port being movable by rotating said retainer member until said port is above said bearing member, said mounting means including clamping means for preventing said retainer member from turning after said oil port is positioned, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

6. In a bearing structure, a bearing bracket, a bearing retainer member, means rotatably mounting said retainer member on said bracket, said means including coaxial aligned at least partially cylindrical locating surfaces on said bracket and said bearing retainer member, an oil seal located between said surfaces, a bearing member within said bearing retainer member and secured to said bracket by said retainer member, said bearing retainer member having an oil port, said oil port being movable by rotating said retainer member until said port is above said bearing member, said mounting means including clamping means for preventing said retainer member from turning after said oil port is positioned and for squeezing said seal between said surfaces, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

7. In a bearing structure, a bearing bracket, a bearing retainer member having an oil port, means rotatably mounting said retainer member on said bracket, said means including coaxial aligned at least partially cylindrical locating surfaces on said bracket and said bearing retainer member, said means including a transversely disposed registering annular web on each locating surface, said means including a locking ring having at least partially cylindrical surfaces telescopically associated and mutually engaging with each of said locating surfaces and a transversely disposed annular web adapted to squeeze said registering webs together for preventing said retainer member from turning after said oil port is positioned, an oil seal between said registering webs, a bearing member within said bearing retainer member and secured to said bracket by said retainer member, said oil port being movable by rotating said retainer member until said port is above said bearing member, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

8. In a self-aligning bearing structure, a bearing bracket, a bearing retainer member, means rotatably mounting said retainer member on said bracket, said means including coaxial aligned at least partially cylindrical locating surfaces on said bracket and said bearing retainer member, a porous bearing member within said bearing retainer member and secured to said bracket by said retainer member, said bearing member having a cylindrical bore therethrough for rotatably supporting a rotatable shaft and having a periphery substantially forming a portion of a sphere, said bracket and said bearing retainer member each having annular surfaces coaxial with the locating surfaces engaging said spherical bearing surface for securing said bearing member between said bracket and retainer member for universal movement, said bearing retainer member having an oil port in vertical alignment with the center of said sphere above the thickest wall of said bearing member, said oil port being movable by rotating said retainer member until said port is above said bearing member, said mounting means including clamping means for preventing said retainer member from turning after said oil port is positioned, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

9. In a self-aligning bearing structure, a bearing bracket, a bearing retainer member having an oil port, means rotatably mounting said retainer member on said bracket, said means including coaxial aligned at least partially cylindrical locating surfaces on said bracket and said bearing retainer member, said means including a transversely disposed registering annular flange on each cylindrical locating surface, said means including a locking ring having cylindrical surfaces telescopically associated and mutually engaging with each of said cylindrical locating surfaces and a transversely disposed annular flange adapted to squeeze said registering flanges together for preventing said retainer member from turning after said oil port is positioned, an oil seal between said registering flanges, a porous bearing member within said bearing retainer member and secured to said bracket by said retainer member, said bearing member having a cylindrical bore therethrough for rotatably supporting a rotatable shaft and having a periphery substantially forming a portion of a sphere, said bracket and said bearing retainer member each having annular surfaces coaxial with the locating surfaces engaging said spherical bearing surface for securing said bearing member between said bracket and retainer member for universal movement, a portion of said bearing retainer being spaced from said bearing member and forming an annular passageway around said bearing member, a wick in said annular passageway engaging the periphery of said porous bearing member, said oil port being in vertical alignment with the center of said sphere above the thickest wall of said bearing member and in the portion of said bearing retainer member forming said annular passageway, said oil port being movable by rotating said retainer member until said port is above said bearing member, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

10. In a bearing structure, a bearing bracket, a bearing retainer member having an oil port, means rotatably mounting said retainer member on said bracket, said means including coaxial aligned at least partially cylindrical locating surfaces on said bracket and said bearing retainer member, said means including a transversely disposed registering annular web on each locating surface, said means including a locking ring having at least partially cylindrical surfaces telescopically associated and mutually engaging with each of said locating surfaces and a transversely disposed annular web adapted to squeeze said registering webs together for preventing said retainer member from turning after said oil port is positioned, a bearing member within said bearing retainer member and secured to said bracket by said retainer member, said oil port being movable by rotating said retainer member until said port is above said bearing member.

11. In a bearing structure, a bearing bracket, a bearing retainer member having an oil port, means rotatably mounting said retainer member on said bracket, said means including coaxial aligned at least partially cylindrical locating surfaces on said bracket and said bearing retainer member, said means including a transversely disposed registering annular web on each locating surface, said means including a locking ring having at least partially cylindrical surfaces telescopically associated and mutually engaging with each of said locating surfaces and a transversely disposed annular web adapted to squeeze said registering webs together for preventing said retainer member from turning after said oil port is positioned, a bearing member within said bearing retainer member and secured to said bracket by said retainer member, said oil port being movable by rotating said retainer member until said port is above said bearing member, a portion of said bearing retainer member being spaced from said bearing member and forming an annular passageway around said bearing member, a wick in said annular passageway engaging at least a portion of the periphery of said bearing member, said oil port comprising an aperture in the periphery of said bearing retainer member forming said annular passageway, and a closure for said oil port slidable in said annular passageway over said wick for closing said port.

12. In a bearing structure, a bearing bracket, a bearing retainer member, means rotatably mounting said retainer member on said bracket, a bearing member within said bearing retainer member and secured to said bracket by said retainer member, and said bearing retainer member having an oil port, said oil port being movable by rotating said retainer member until said port is above said bearing member, said mounting means including clamping means engaging at least partially coaxial annular portions on said bearing bracket and bearing retainer member for permitting turning of said oil port without disassembly when unclamped but preventing said retainer member from turning when clamped after said oil port is positioned.

13. In a bearing structure, a bearing bracket, a bearing retainer member, means rotatably mounting said retainer member on said bracket, a bearing member within said bearing retainer member and secured to said bracket by said retainer member, and said bearing retainer member having an oil port, said oil port being movable by rotating said retainer member until said port is above said bearing member, said mounting means including annular clamping means engaging at least partially coaxial annular portions on said bearing bracket and bearing retainer member for permitting turning of said oil port without disassembly when unclamped but preventing said retainer member from turning when clamped after said oil port is positioned.

14. In a bearing structure, a bearing housing, a porous bearing member within said bearing housing, said bearing member having a cylindrical bore therethrough for rotatably supporting a shaft, said bearing housing having an oil port, a portion of said bearing housing being spaced from said bearing member and forming an annular passageway around said bearing member, a wick in said annular passageway, said wick conforming in shape to said annular passageway and nearly completely surrounding said bearing member while engaging the periphery of said bearing member, said oil port comprising a circumferentially elongated aperture in the periphery of said bearing housing portion forming said annular passageway, a closure for said oil port slidably mounted in said annular passageway over said wick for closing said port, said closure extending circumferentially throughout the length of said passageway to surround said wick except for an arcuate extent between its free ends approximately equal to said elongated aperture, the arcuate form of said closure coacting with the annular passageway of said bearing housing maintaining radial alignment of said closure in said housing, and alignment means on said bearing housing coacting with said closure for maintaining axial alignment therebetween, whereby oil in said wick is adapted to permeate the pores of said bearing member from the bearing periphery to the cylindrical bore.

15. In a bearing structure, as set forth in claim 14, said closure having an integral actuating tab bent outwardly from one of said free ends and projecting outwardly through said oil port for opening and closing thereof, said tab extending substantially the full axial width of said aperture and said aperture being of uniform width to provide a maximum width actuating tab and at least a portion of said alignment means.

16. In a bearing structure, a bearing housing, a porous bearing member within said bearing housing, said bearing member having a cylindrical bore therethrough for rotatably supporting a shaft, a portion of said bearing housing being spaced from said bearing member and forming an annular passageway around said bearing member, and a wick in said annular passageway conforming in shape thereto and nearly completely surrounding said bearing member while engaging the periphery of said bearing member, said bearing housing having an oil port comprising an aperture in the periphery thereof forming said annular passageway, the ends of said wick being spaced apart to form a reservoir in radial alignment with said oil port while lubrication is inserted through said port.

17. In a bearing structure, as set forth in claim 16, said oil port aperture is circumferentially elonagted, and a closure for said oil port is slideably mounted in said annular passageway over said wick for closing said port to prevent leakage from said reservoir.

18. In a bearing structure, as set forth in claim 17, said closure and wick are in frictional engagement tending to urge said wick to move about said bearing during port opening and closing movement of said closure, and means are provided for maintaining said reservoir in alignment with said port in port open position.

19. In a bearing structure, as set forth in claim 18, wherein the closure is secured to the wick so that the wick, closure and reservoir rotate together around said bearing member as said closure is operated to open and close said port.

References Cited in the file of this patent
UNITED STATES PATENTS

| | | |
|---|---|---|
| 769,331 | Allen | Sept. 6, 1904 |
| 791,086 | Deutsch | May 30, 1905 |
| 1,214,158 | Hansen | Jan. 30, 1917 |
| 2,073,707 | Parkin | Mar. 16, 1937 |
| 2,225,623 | Crawford | Dec. 24, 1940 |
| 2,233,104 | Martinet | Feb. 25, 1941 |
| 2,270,392 | Talmage | Jan. 20, 1942 |